(No Model.) 3 Sheets—Sheet 1.

F. G. BIRCHARD.
MACHINE FOR MAKING STICK CANDY.

No. 426,521. Patented Apr. 29, 1890.

Witnesses
M. C. Fowler
J. W. Garner

Inventor
Ford G. Birchard
By his Attorneys,

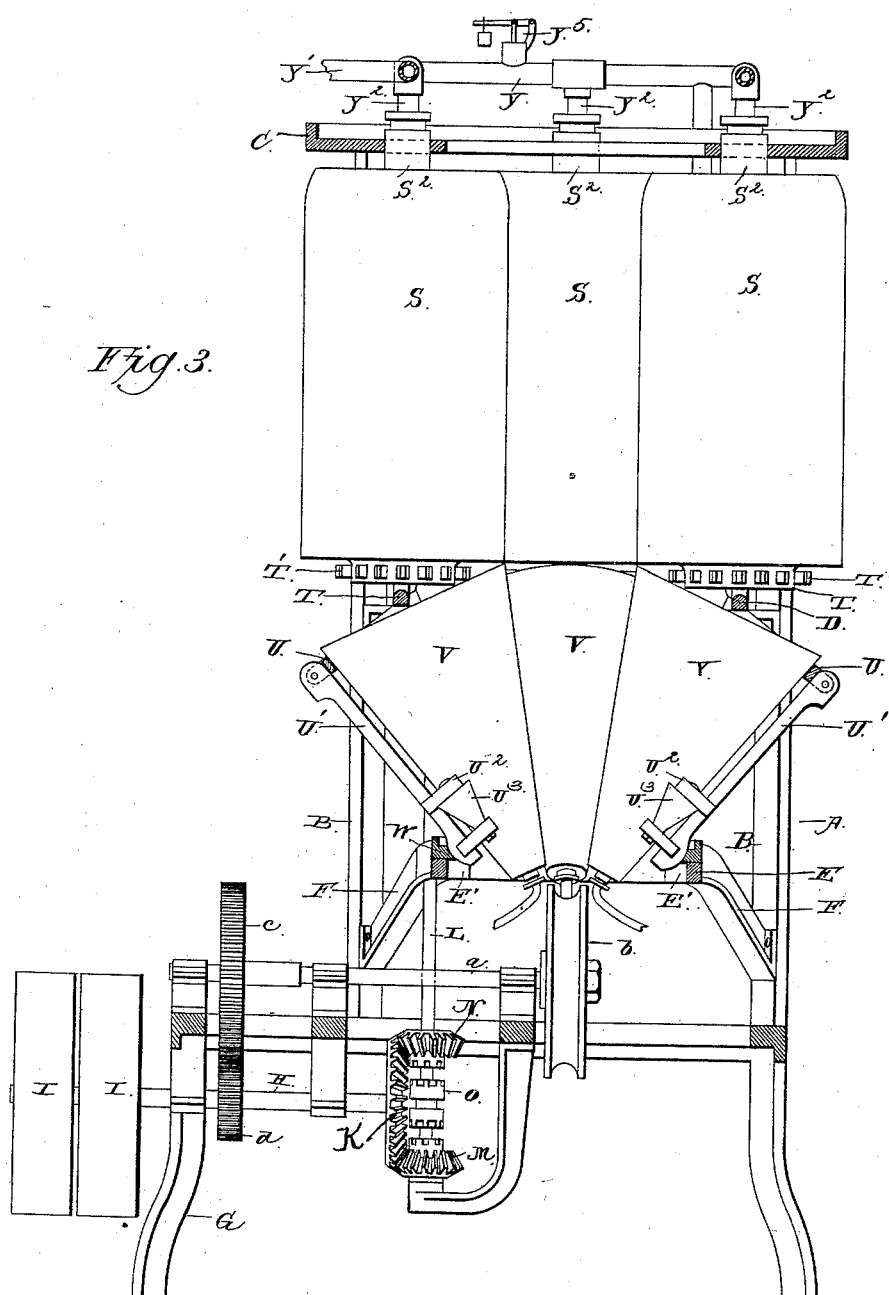

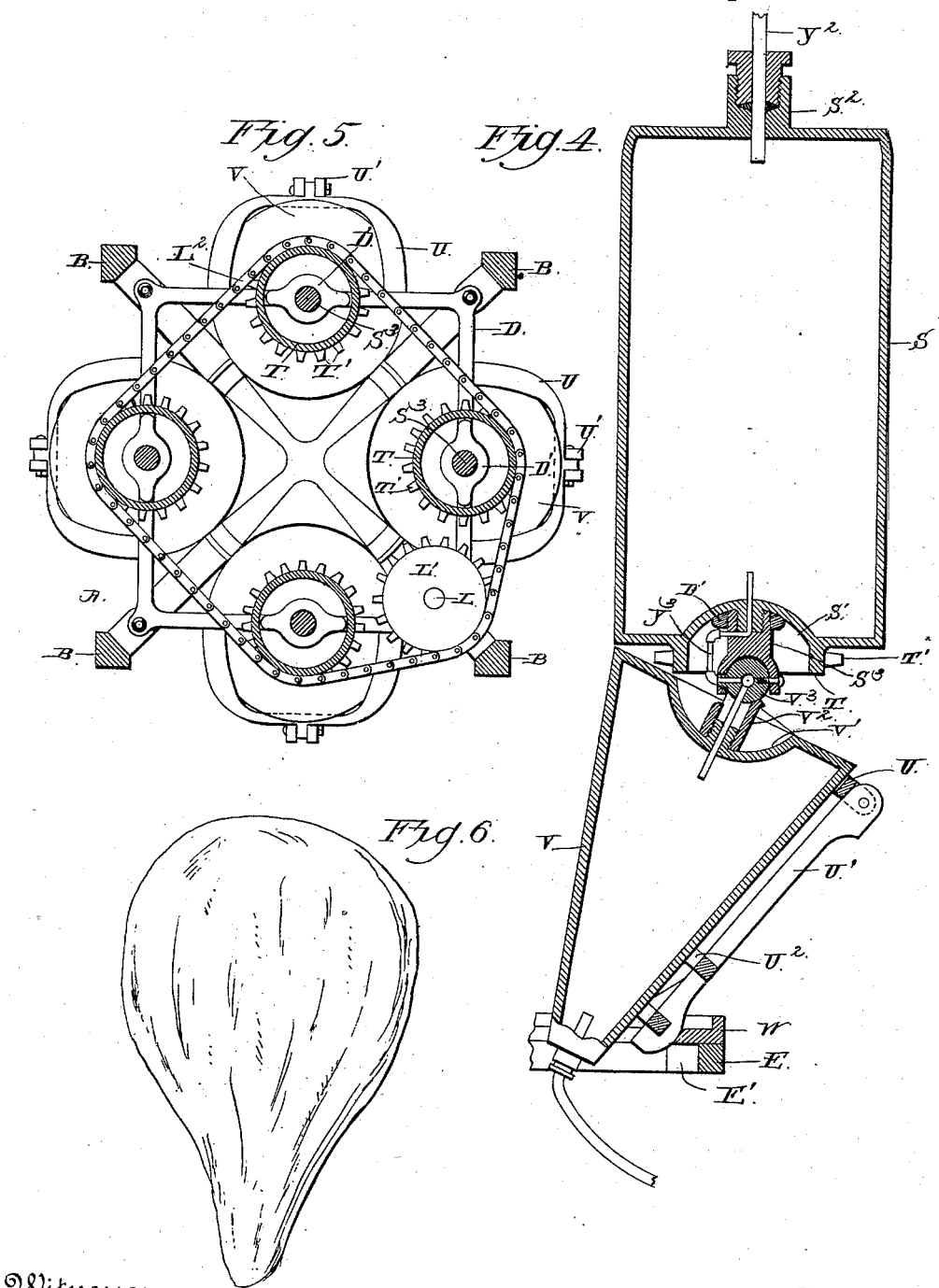

UNITED STATES PATENT OFFICE.

FORD G. BIRCHARD, OF WILLIAMSPORT, PENNSYLVANIA.

MACHINE FOR MAKING STICK-CANDY.

SPECIFICATION forming part of Letters Patent No. 426,521, dated April 29, 1890.

Application filed March 26, 1887. Renewed June 13, 1889. Serial No. 314,144. (No model.)

*To all whom it may concern:*

Be it known that I, FORD G. BIRCHARD, a citizen of the United States, residing at Williamsport, in the county of Lycoming and State of Pennsylvania, have invented a new and useful Improvement in Machines for Making Stick-Candy, of which the following is a specification.

My invention relates to an improvement in machines for making stick-candy; and it consists in the peculiar construction and combination of devices that will be more fully set forth hereinafter, and particularly pointed out in the claims.

This invention is an improvement on the candy-machine for which Letters Patent of the United States, No. 307,003, were granted to me October 21, 1884; and the object of my improvement is to enable the machine to be made of increased size and capacity without causing it to become ill-shaped, top-heavy, and unwieldy.

A further object of my invention is to provide means for heating the rolls at a uniform temperature and to any desired degree.

A further object of my invention is to provide means for reversing the rotation of the rolls, so as to effect any desired twist in the stick of candy.

A final object of my invention is to provide means for supporting the lower ends of the conical rolls, and thereby permit bearings on the lower ends of the said rolls to be dispensed with, to the end that the candy may not be injured by lubricating-oil from the bearings.

Figure 1:
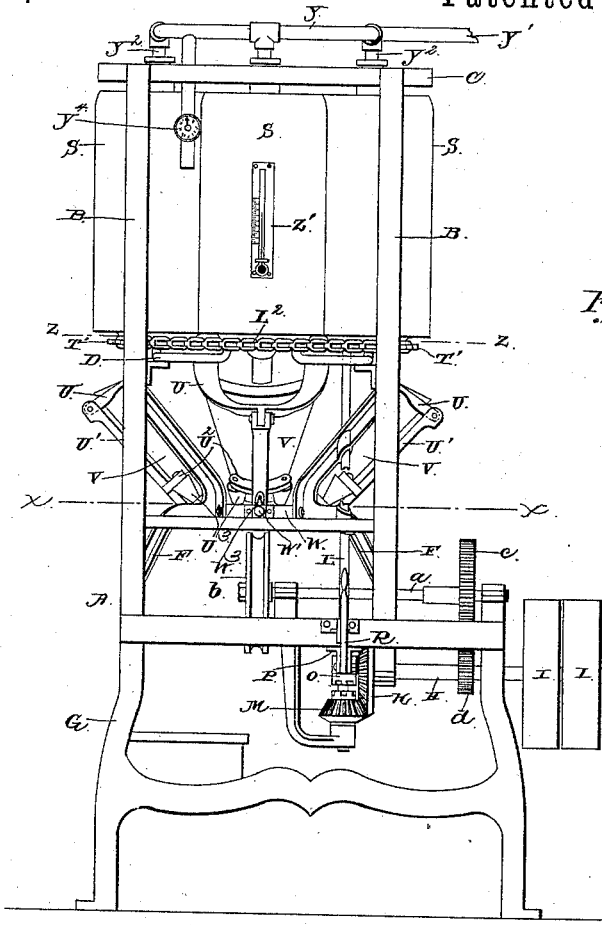
Figure 2:
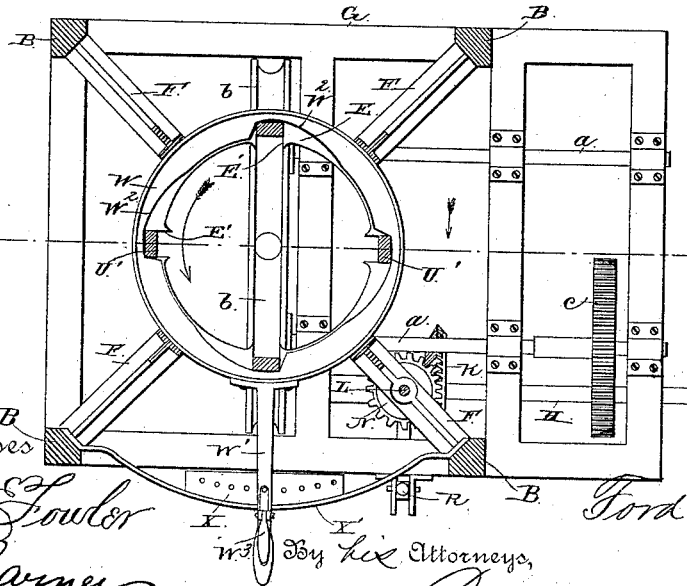

In the accompanying drawings, Figure 1 is an elevation of a candy-machine embodying my improvements. Fig. 2 is a horizontal sectional view of the same, taken on the line $x$ $x$ of Fig. 1. Fig. 3 is a vertical sectional view of the same, taken on the line $y$ $y$ of Fig. 2. Fig. 4 is an enlarged vertical sectional view of one of the conical rolls, the straight roll, and the universal joint connecting them together. Fig. 5 is a horizontal sectional view taken on the line $z$ $z$ of Fig. 1. Fig. 6 is a view of a batch of candy.

A represents a vertical rectangular frame comprising the corner-standards B, connected at their upper ends by a ring C and near their centers by a ring D. Near the lower ends of the standards is a horizontal ring E, which is much smaller in diameter than the rings C and D and is supported by inclined brace-arms F, that are attached to the standards. The frame A is supported upon a suitable rectangular base-frame G, which projects beyond one side of the frame A.

H represents a driving-shaft, which is journaled horizontally in blocks, with which the frame G is provided. On the outer end of the shaft H is mounted a pair of pulleys I, one of them being fast to and the other loose on the said shaft, and to the inner end of the shaft is rigidly attached a miter gear-wheel K.

L represents a vertical shaft that is journaled in suitable bearings, with which the frames are provided. Near the lower end of this shaft is a loose miter-pinion M, that engages the lower side of wheel K, and attached also to the said shaft is a loose miter-pinion N, that engages the upper side of wheel K.

O represents a double clutch member that is feathered or splined on the shaft L, so as to rotate therewith, the said clutch member being vertically movable on the shaft L and adapted to engage with the said pinions, so as to lock them to the shaft. A bracket P is bolted to one side of the frame G at right angles to the driving-shaft, and to this bracket is fulcrumed a right-angled lever R, the inner horizontal arm of which is connected to the clutch member. The vertical arm of the lever is on one side of the frame and is provided with a handle to enable it to be readily grasped. It will be noted that by moving the hand-lever R, so as to cause the clutch member to engage the pinion N, the shaft L will be caused to rotate in one direction when the main shaft is in motion, and that when the pinion M is engaged by the clutch member the shaft L will be rotated in the contrary direction, for the purpose to be hereinafter described.

S represents a series of vertical rollers, which are journaled between the rings C and D and are arranged around a common center, the inner sides of the rollers being a suitable distance apart. These rollers are hollow, and their bottoms have concave recesses S', that bear on convex offsets D' on the upper side of the ring D. Hubs or bosses S² project from the upper ends of the rollers S and extend through openings made in the ring C, and depending bosses S³ extend from the lower ends of the said rollers and bear in openings made in the offsets D'. On the lower ends of the rollers surrounding the recesses S' are annular rings T, having sprocket-teeth T' on their outer sides. The ring E is provided on its inner edge with radial open slots E'.

U represents semicircular brackets that are bolted to the ring D and extend outwardly and downwardly therefrom. To the central portions of these brackets are pivoted the upper ends of inclined arms U', the lower ends of which arms bear in the open slots E'. Near the lower ends of the arms U' are inclined curved arms U², between the ends of which are journaled anti-friction bearing-rollers U³, which are conical in shape, as shown.

V represents inclined conical rollers, which are hollow and have the concave recesses V' on their upper ends at the centers thereof. From the centers of the said recesses project bosses V², which are connected to the depending bosses S³ by means of universal joints V³, and thereby the conical rollers are connected to the vertical straight rollers and are adapted to rotate therewith. The lower ends of the conical rollers converge, and the said rollers are supported by the bearing-rollers U³.

W represents a ring, which bears on the upper side of the ring E, and is adapted to partly rotate thereon, and is provided with a projecting lever-bar W', by means of which it may be moved. On the inner edge of the ring W, and coincident with the open slots E' of the ring E, are eccentric or cam-shaped recesses W², in which the arms U' rest.

From the foregoing it will be readily understood that the lower ends of the conical rollers may be caused to approach each other to reduce the diameter of the space or opening between them by moving the cam-ring in the direction indicated by the arrow in Fig. 2. By moving the cam-ring in the contrary direction the lower ends of the conical rollers will be caused to recede from each other, so as to enlarge the space or opening between them. A perforated plate X is supported by a curved arm X', attached to the frame A, and the outer portion of the lever-bar W' bears on the said plate and is provided with a locking pin or bolt W³ to engage the openings in the plate and thereby lock the cam-ring in any desired position.

Heretofore machines of this class have had the lower ends of the conical rolls provided with journaled bearings. This is disadvantageous, for the reason that the lubricating-oil necessarily used on the said bearings sometimes gets on the candy as it is being made and imparts a bad taste thereto. It will be noted that by the use of bearing-rollers to support the lower ends of the conical rolls I am enabled to entirely dispense with the journaled bearings heretofore used, and thus obviate the defect before mentioned.

Another defect heretofore existing in this class of machines is that the capacity of the machine can only be increased by lengthening the conical rolls. This necessarily also widens the upper ends thereof to a proportionate degree, resulting in making the machine unsightly, top-heavy, and unwieldy. I overcome this disadvantage by connecting the straight vertical rollers S to the upper ends of the conical rolls, and thereby lengthen the surfaces of the rollers to any desired extent and correspondingly increase the capacity of the machine without increasing the length of the conical rollers.

Near the upper end of the shaft L is a rigid sprocket-wheel L'. An endless sprocket-chain L² passes over the sprocket-teeth at the lower ends of the straight rollers, and also over the wheel L', and thereby, when the shaft L is rotated by the rotation of the driving-shaft, the rollers S and the conical rollers are also caused to rotate and in the same direction.

A batch of candy of the general form shown in Fig. 6 being introduced into the opening between the upper ends of the rollers S, is compressed and rotated by the same and becomes attenuated, and descends by its own gravity until it reaches the conical rollers and is given cylindrical form. By the less rapid presentation of surfaces of the lower ends of the conical rollers, due to the decreased diameter thereof, the candy is also twisted at the same time that it is compressed and lengthened, the result being that the candy is discharged from the lower ends of the conical rollers in the form of a stick.

It is necessary during the operation of the machine to keep the rollers at a proper temperature in order to manipulate the candy so as to obtain the best results. To accomplish this I provide the devices hereinafter described. Y represents a steam-pipe, which is arranged above the upper ends of the rollers S, and is provided with a supply-pipe Y' to provide steam from a suitable steam-generator. (Not shown.) Pipes Y² depend from the pipe Y and extend through longitudinal bores made through the bosses S², so as to introduce steam into the rollers. Steam-pipes Y³ also connect the rollers S with the inclined conical rollers and extend through the bosses S³ and V², so that steam is also introduced into the rollers V to heat the same. A steam-gage Y⁴ is connected to the pipe Y to indicate the pressure of the steam in the rollers. A valve Y⁵ is provided to regulate the pressure of the steam in the rollers, and thereby control the temperature thereof, and a thermometer Z' is embedded in one side of the rollers S to indicate the temperature of the rollers.

a represents a pair of shafts, which are journaled horizontally in the frame of the machine and are arranged parallel with each other. To the inner ends of these shafts are secured feed-rollers $b$, the peripheries of which are grooved to receive the candy as it is ejected from between the inclined conical rollers and to give it the required shape and density. One of the shafts $a$ has a gear-wheel $c$, which meshes with a pinion $d$ on the driving-shaft H, thus causing one of the feed-rollers to be rotated by the driving-shaft, the other feed-roller being rotated by frictional contact with the first.

I do not desire to limit myself to the precise construction hereinbefore described, as it is evident that modifications may be made therein without departing from the spirit of my invention.

Having thus described my invention, I claim—

1. In a candy-machine, the combination of the rotating inclined conical rollers arranged around a common center, and the straight rollers connected to the conical rollers, rotating therewith and forming extensions thereof for the purpose set forth, substantially as described.

2. The combination, in a candy-machine, of the conical inclined rollers having the bearings at their upper ends, and the pivoted arms $U'$, having the bearing-rollers $U^3$, supporting the lower ends of the inclined rollers, the lower ends of the said arms being radially adjustable, substantially as described.

3. In a candy-machine, the combination of the inclined conical rollers, the straight cylindrical rollers, and the universal joints to connect the conical and straight rollers together, substantially as described.

4. In a candy-machine, the combination of the inclined conical rollers, the vertical cylindrical rollers connected by universal joints to the upper ends of said inclined conical rollers, mechanism for imparting rotary motion to the said vertical cylindrical rollers, and reversing mechanism for reversing the direction of rotation, substantially as set forth.

5. In a candy-machine, the combination of the inclined conical rollers hung or suspended from universal joints, and the conical bearing-rollers to support the lower ends thereof, substantially as described.

6. The combination, in a candy-machine, of the straight upper rollers S, arranged around a common center and having the sprocket-wheels, the endless sprocket-chain engaging the said wheels, the inclined conical rollers, the universal joints connecting the upper ends of the inclined rollers to the lower ends of the straight rollers, and the rotating shaft L, having the sprocket-wheel $L'$ engaging the sprocket-chain and thereby rotating the rollers, substantially as described.

7. In a candy-machine, the combination of the straight upper rollers S, the inclined conical lower rollers V, attached thereto, the lower ends of the conical rollers being adjustable toward and from each other, substantially as described.

8. In a candy-machine, the combination of the conical inclined rollers having the bearings at their upper ends, and the arms $U'$, carrying the bearing-rollers $U^3$ to support the lower ends of the conical rollers, substantially as described.

9. In a candy-machine, the combination of the frame, the vertical cylindrical rollers S, arranged around a common center and journaled in the frame, the conical inclined rollers having their upper ends connected to the lower ends of the rollers S, the hinged or pivoted arms $U'$, carrying the bearing-rollers $U^3$ to support the lower ends of the conical rollers, and the cams to adjust the said arms, for the purpose set forth, substantially as described.

10. In a candy-machine, the combination of the hollow cylindrical rollers, the hollow conical rollers, the universal joints connecting the said cylindrical and conical rollers, and the steam pipes or passages through the said joints, for the purpose set forth, substantially as described.

11. In a candy-machine, the combination, with the vertical cylindrical and the inclined conical hollow steam-heated rollers, of the universal joints and the steam-passages connecting the said vertical cylindrical with the said inclined conical rollers, substantially as and for the purpose set forth.

12. In a candy-machine, the combination of the frame, the vertical cylindrical rollers S, arranged around a common center and journaled in the frame, the conical inclined rollers having their upper ends connected to the lower ends of the rollers S, the hinged or pivoted arms $U'$, having the rollers $U^3$ to support the conical rollers, the lower ends of said arms $U'$ being radially adjustable, and the ring W, having the tangential cams engaging the arms $U'$ and provided with the lever $W'$, whereby it may be turned, for the purpose set forth, substantially as described.

In testimony that I claim the foregoing as my own I have hereto affixed my signature in presence of two witnesses.

FORD G. BIRCHARD.

Witnesses:
PHILIP MILLER,
WILLIAM H. BENNETT.